United States Patent [19]

Vizzini et al.

[11] Patent Number: 6,143,686
[45] Date of Patent: *Nov. 7, 2000

[54] SUPPORTED IONIC CATALYST COMPOSITIONS

[75] Inventors: James C. Vizzini, Pasadena; Rajan K. Chudgar, League City, both of Tex.

[73] Assignee: Exxon Chemical Patents, Inc., Baytown, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/184,389

[22] Filed: Nov. 2, 1998

Related U.S. Application Data

[63] Continuation-in-part of application No. 08/776,738, Jul. 14, 1997, Pat. No. 5,972,823, which is a continuation-in-part of application No. 08/474,948, Jun. 7, 1995, Pat. No. 5,643, 847, which is a continuation-in-part of application No. 08/285,380, Aug. 3, 1994, abandoned.

[51] Int. Cl.[7] .............................. B01J 31/00; C08F 4/44; C08F 4/06; C08F 110/06
[52] U.S. Cl. ..................... 502/152; 502/155; 526/129; 526/131; 526/134; 526/351; 526/993
[58] Field of Search .................... 502/152, 153, 502/155; 526/129, 131

[56] References Cited

U.S. PATENT DOCUMENTS 3,036,048 5/1962 Von Falkai et al. .................... 502/103

(List continued on next page.)

FOREIGN PATENT DOCUMENTS 0 426 637 5/1991 European Pat. Off. .

(List continued on next page.)

OTHER PUBLICATIONS

S. Collins et al., Macromolecules, vol. 25, No. 6, pp. 1780–1785, 1992.

(List continued on next page.)

*Primary Examiner*—Mark L. Bell
*Assistant Examiner*—J. Pasterczyk

[57] ABSTRACT

This invention relates to supported metallocene catalyst compositions useful for addition reactions of prochiral α-olefins. Polymers, specifically propylene polymers, produced with this catalyst possess higher stereoregularities and consequently higher melting points compared to propylene polymers produced using previously known supported metallocene catalysts. The microstructure of the polymers obtained using the supported catalyst systems of this invention is similar to that obtained using analogous unsupported catalysts. The catalyst compositions comprise transition metal (i.e., metallocene) cations and beam comprising anionic activators in prescribed ratios on metal or metalloid oxide supports. The transition metal compound is represented by the formula:

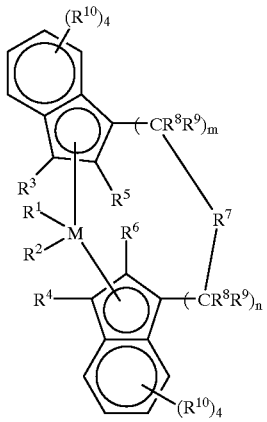

wherein M is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$—$C_{10}$ alkyl group, or a $C_6$–$C_{10}$ aryl group;

$R^7$ is

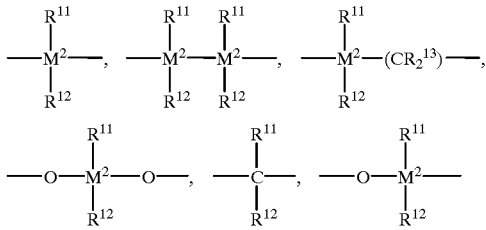

—$B(R^{11})$—, —$Al(R^{11})$—, —Ge—, —Sn, —O—, —S—, —SO—, —$SO_2$—, —$N(R^{11})$—, —CO—, —$P(R_{11})$—, or —$P(O)(R^{11})$—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^3$, $R^4$ and $R^{10}$ are identical or different and have the meanings stated for $R^{11}$, $R^{12}$ and $R^{13}$ and two adjacent $R^{10}$ radicals can be joined together to form a ring system.

10 Claims, No Drawings

U.S. PATENT DOCUMENTS

| | | |
|---|---|---|
| 5,001,205 | 3/1991 | Hoel .................................................. 502/117 |
| 5,036,034 | 7/1991 | Ewen .................................................. 502/103 |
| 5,057,475 | 10/1991 | Canich et al. ..................................... 502/103 |
| 5,198,401 | 3/1993 | Turner et al. ..................................... 502/152 |
| 5,206,197 | 4/1993 | Campbell, Jr. ................................... 502/103 |
| 5,288,677 | 2/1994 | Chung et al. ..................................... 502/152 |
| 5,296,433 | 3/1994 | Siedel et al. ..................................... 502/103 |
| 5,308,816 | 5/1994 | Tsutsui et al. ................................... 502/117 |
| 5,427,991 | 6/1995 | Turner .............................................. 526/131 |
| 5,428,120 | 6/1995 | Newman et al. ................................. 526/160 |
| 5,444,134 | 8/1995 | Matsumoto ....................................... 526/160 |
| 5,453,410 | 9/1995 | Kolthammer et al. ........................... 502/152 |
| 5,500,398 | 3/1996 | Marks et al. ..................................... 502/103 |
| 5,502,017 | 3/1996 | Marks et al. ..................................... 502/103 |
| 5,599,761 | 2/1997 | Turner .............................................. 502/152 |
| 5,643,847 | 7/1997 | Walzer, Jr. ....................................... 502/117 |
| 5,663,249 | 9/1997 | Ewen et al. ...................................... 502/152 |
| 5,719,095 | 2/1998 | Brekner et al. .................................. 502/152 |
| 5,721,183 | 2/1998 | Neithamer ........................................ 502/117 |
| 5,763,547 | 6/1998 | Kolthammer et al. ........................... 526/129 |
| 5,763,549 | 6/1998 | Elder et al. ....................................... 502/117 |
| 5,783,512 | 7/1998 | Jacobsen et al. ................................. 502/103 |
| 5,801,113 | 9/1998 | Jejelowo et al. ................................. 502/117 |
| 5,807,938 | 9/1998 | Kaneko et al. ................................... 502/103 |
| 5,807,940 | 9/1998 | Aoyama et al. .................................. 502/103 |
| 5,834,393 | 11/1998 | Jacobsen et al. ................................. 502/152 |
| 5,861,352 | 1/1999 | Gila et al. ......................................... 502/155 |
| 5,939,347 | 8/1999 | Ward et al. ....................................... 202/152 |
| 5,972,823 | 10/1999 | Walzer, Jr. ....................................... 502/152 |

FOREIGN PATENT DOCUMENTS

| | | |
|---|---|---|
| 0 427 697 | 5/1991 | European Pat. Off. . |
| 0 520 732 | 12/1992 | European Pat. Off. . |
| 0 633 272 | 1/1995 | European Pat. Off. . |
| 0 727 443 | 8/1996 | European Pat. Off. . |
| 0 767 184 | 4/1997 | European Pat. Off. . |
| WO 91/09882 | 7/1991 | WIPO . |
| WO 93/11172 | 6/1993 | WIPO . |
| WO 93/19103 | 9/1993 | WIPO . |
| WO 94/00500 | 1/1994 | WIPO . |
| WO 94/03506 | 2/1994 | WIPO . |
| WO 94/07928 | 4/1994 | WIPO . |
| WO 95/15815 | 6/1995 | WIPO . |
| WO 95/23816 | 9/1995 | WIPO . |
| WO 96/04319 | 2/1996 | WIPO . |
| WO 96/40805 | 12/1996 | WIPO . |
| WO 97/48735 | 12/1997 | WIPO . |
| WO 98/27119 | 6/1998 | WIPO . |
| WO 98/34964 | 8/1998 | WIPO . |

OTHER PUBLICATIONS

"*Comprehensive Organometallic Chemistry*", I. Geoffrey Wilkinson, vol. 1, pp. 266–267 (1982).

M.P. McDaniel, Advances in Catalysis, vol. 33, pp. 47–97, 1985.

J.C.W. Chien et al., J. Polymer Science: Part A: Polymer Chemistry, vol. 29, pp. 1603–1607., 1991.

R. Quyoum et al., J. Am. Chem. Soc., vol. 116, pp. 6435–6436, 1994.

X. Yang et al., J. Am. Chem. Soc., vol. 113, pp. 3623–3625; 1991.

SUPPORTED IONIC CATALYST COMPOSITIONS

This application is which is a CIP of U.S. Pat. No. 5,643,847 filed Jun. 7, 1995 which was application Ser. No. 08/474,948 filed Jun. 7, 1995 which is a continuation-in-part of Ser. No. 08/285,380 filed Aug. 3, 1994, abandoned.

TECHNICAL FIELD

This invention relates to supported inetallocene catalyst compositions useful for addition reactions of prochiral α-olefins. Polymers, specifically propylene polymers, produced with this catalyst possess higher stereoregularities and consequently higher melting points compared to propylene polymers produced using previously known supported inetallocene catalysts. The microstructure of the polymers obtained using the supported catalyst systems of this invention is similar to that obtained using analogous unsupported catalysts. The catalyst compositions comprise transition metal (i.e., metallocene) cations and anionic activators in prescribed ratios on metal oxide supports.

BACKGROUND OF THE INVENTION

Coordination polymerization of olefinically unsaturated monomers is well known and has led to the great proliferation of elastomeric and plastic compositions of matter, such as polyethylene, polypropylene, and ethylene propylene rubber. Early pioneers utilized catalysts with such activators as aluminum alkyls and later development extended this work to bulky ligand-containing (e.g., $\eta^5$-cyclopentadienyl) transition metals ("transition metal compounds") with activators such as alkyl alumoxanes. The most recent developments have shown the effectiveness of ionic catalysts comprised of transition metal compound cations activated by noncoordinatinig anions. See for example EP-A-277 004 and U.S. Pat. No. 5,198,401, both of which are fully incorporated by reference. These references describe protonation of transition metal compounds by anion precursors to form stable ionic catalysts.

U.S. Pat. No. 5,427,991 describes the chemical bonding of noncoordinating anionic activators to supports so as to prepare polyanionic activators that when used with the transition metal compound, avoids the problem of catalyst desorption experienced when ionic catalysts physically adsorbed on inert supports are utilized in solution or slurry polymerization. The supports are inert monomeric, oligomeric, polymeric or metal oxide supports which have been prepared so as to incorporate chemically bound, non-coordinating anions.

There is a need to address further both the preparation of supported ionic catalyst systems, and a need to find supported metallocene catalysts that do not adversely affect the polymer product. Substituted, bridged indenyl transition metal compounds, supported on silica or polymer supports, have long been observed to produce polypropylenes with more regio defects and subsequently shorter meso run lengths as determined by $^{13}$C NMR compared to the propylene polymers produced by the respective unsupported transition metal compounds in solution. These defects result in a decrease in the polymer melting point which is undesirable for many applications. This invention solves this long-standing problem by minimizing or even eliminating these defects through manipulation of the activator to transition metal ratio.

SUMMARY

This invention relates generally to catalyst compositions comprising a metal oxide support having covalently bound to the surface thereof directly through the oxygen atom of the metal oxide an activator anion that is also ionically bound to a catalytically active transition metal compound, wherein the transition metal compound is present in the range of from about 0.01 to about 0.3 mmol/g finished catalyst, wherein the activator anion is present in the range of from about 0.01 to about 0.3, mmol/g finished catalyst and wherein the transition metal compound is represented by the formula:

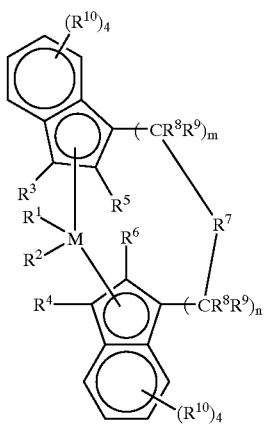

wherein M is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, or a $C_8$–$C_{40}$ arylalkenyl group;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

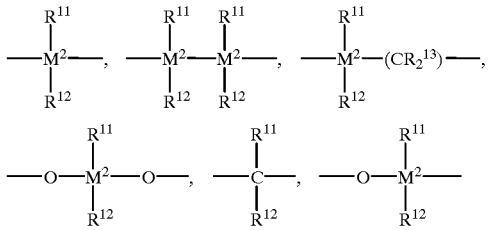

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, I or 2, m plus n being zero, 1 or 2; and the radicals $R^3$, $R^4$ and $R^{10}$ are identical or different and have the meanings stated for $R^{11}$, $R^{12}$ and $R^{13}$ and two adjacent $R^{10}$ radicals can be joined together to form a ring system.

DETAILED DESCRIPTION

This invention is directed to transition metal catalyst compositions comprising a metal oxide support having covalently bound to the surface thereof directly through the oxygen atom of the metal oxide an activator anion that is also ionically bound to a catalytically active transition metal cation compound. The activator to transition metal compound ratio is greater than 2.5 meq. Additionally the invention includes a polymerization process comprising contacting one or more monomers polymerizable by coordination or carbocationic polymerization under conventionally suitable polymerization conditions using the invention catalyst composition. The catalyst compositions of this invention are particularly suitable for propylene polymerizations as they provide control of poly($\alpha$-olefin) microstrucure and consequently increased melting points.

The invention catalyst composition described above can be generically represented by the chemical formula:

$$[L_n L'_m M'R']^+[LA-O-M''-]^- \qquad (1)$$

where $[L_n L'_m M'R']^+$ is the catalytically active transition metal cation and $[LA-O-M''-]^-$ is metal oxide support bound activator anion. More specifically, $L_n$ is one or more ligands (n equals $d^0$–1 where $d^0$ is the highest oxidation state of M') covalently bound to M', $L'_m$ is a neutral, non-oxidizing ligand having a dative bond to M' (typically m equals 0 to 3), M' is a Group 4, 5, 6, 9, or 10 transition metal, R' is a ligand having a $\sigma$ bond to M' into which a polymerizable monomer or macromonomer can insert for coordination polymerization. LA is a Lewis acid that is capable of forming the anionic activator, O is oxygen, and M''— is the metal/metalloid of the metal oxide support.

The metal oxide supports of the invention include any metal/metalloid oxides having surface hydroxyl groups exhibiting a $pK_a$ equal to or less than that observed for amorphous silica, i.e., $pK_a$ less than or equal to about 11. In a preferred method of forming the covalently bound anionic activator, an LA is selected that is capable of forming a dative complex with a silanol group (which acts as a Lewis base) thus forming a formally dipolar (zwitterionic) Bronsted acid structure bound to the metal/metalloid of the metal oxide support. Accordingly any of the conventionally known silica support materials that retain hydroxyl groups after dehydration treatment methods will be suitable. Due to their commercial availability, silica, and silica containing metal oxide based supports, for example, silica-alumina, are preferred. Silica particles, gels and glass beads are most typical.

These metal oxide compositions may additionally contain oxides of other metals, such as those of Al, K, Mg, Na, Si, Ti and Zr and should preferably be treated by thermal and/or chemical means to remove water and free oxygen ("dehydration"). Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C., or more up to a point prior to decomposition of the support material, for several hours is permissible, and if higher loading of supported anionic activator is desired, lower calcining temperatures for lesser times will be suitable.

Where the metal oxide is silica, loadings to achieve from less than 0.1 mmol to 3.0 mmol activator anion per gram $SiO_2$ are typically suitable and can be achieved, for example, by varying the temperature of calcining from 200 to 800+° C. See Zhuralev, et al, Langmuir 1987, vol. 3, 316 where correlation between calcining temperature and times and hydroxyl contents of silicas of varying surface areas is described. Other metal oxides such as alumina and silicates would require proscribed calcination treatment to achieve the hydroxyl content necessary for binding $\leq 0.3$ mmol of activator anion per gram of support to the surface.

The activator anion neutral precursors that serve as the Lewis acid (LA) of the invention include any of the non-coordinating anion precursors of sufficient acidity to accept the available electron pair of the hydroxyl group oxygen atom and facilitate the protonation of the transition metal compound or a secondary proton acceptor (see below) by the silanol group proton. The preferred activator anion neutral precursors that serve as the Lewis acid (LA) are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., tris perfluorophenyl boron, tris perfluoronaphthylboron, tris perfluoro biphenyl boron. These precursors therefore should not possess any reactive ligands which can be protonated by the hydroxyl groups of the metal oxide (the silanol group proton). For example, any Group 13 element based Lewis acids having only alkyl, halo, alkoxy, and/or amido ligands, which are readily hydrolyzed in aqueous media, are not suitable. At least one ligand of LA must be sufficiently electron-withdrawing to achieve the needed acidity, for example, trisperfluorophenyl boron, under typical reaction conditions. Typical metal/metalloid centers for LA will include boron, aluminum, antimony, arsenic, phosphorous and gallium. Most preferably LA is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di(trifluoromethyl)phenyl)boron, tris(di-t-butylmethylsilyl) perfluorophenylboron, and other highly fluorinated trisarylboron compounds.

Any catalytically active transition metal compound, including the known transition metal compounds useful in traditional Ziegler-Natta coordination polymerization and as well the transition metal compounds similarly known to be useful in coordination polymerization, may be used in accordance with this invention when such compounds are capable of catalytic activation by the support bound anionic activator. These will typically include transition metal compounds where the metal is in a $d^0$ oloefinic state, that is where the metal has its highest oxidation number, and wherein at least one metal ligand can be protonated by the support bound anionic activator, particularly those ligands including hydride, alkyl and silyl. Ligands capable of protonation and transition metal compounds comprising them include those described in, for example, EP-A-277,003, EP-A-277,004 and U.S. Pat. No. 5,198,401 (each fully incorporated herein by reference). Syntheses of these compounds is well known from the published literature.

Additionally, where the metal ligands include halogen moieties (for example, bis-cyclopentadienyl zirconium dichloride) which are not capable of protonation under standard conditions, they can be converted via known alkylation reactions with organometallic compounds such as lithium or aluminum hydrides or alkyls, alkylalumoxanes, Grignard reagents, etc. See also EP-A1-0 570 982 (fully incorporated herein by reference) for the reaction of organoaluminum compounds with dihalo-substituted transition metal compounds prior to addition of activating anion compounds.

Additional description of transition metal compounds which comprise, or can be alkylated to comprise, at least one ligand capable of abstraction via protonation to form a transition metal cation appear in the patent literature, for example, EP-A-0 129 368, EP-A-0-418 044, EP-A-0 591 756, WO-A-92/00333 and WO-A-94/01471, and U.S. Pat. Nos. 4,871,705, 4,937,299, 5,324,800 (each fully incorporated herein by reference). Such transition metal compounds can be described as mono-, bis-, or tris-cylopentadienyl substituted Group 4, 5, 6, 9, or 10 transition metal compounds wherein the cyclopentadienyl substituents may be themselves substituted with one or more groups and may be bridged to each other, or may be bridged through a heteroatom to the transition metal. The size and constituency of the cyclopentadienyl substituents and bridging elements are not critical to the preparation of the ionic catalyst systems of the invention but should be selected in the literature described manner to enhance the polymerization activity and polymer characteristics being sought. Preferably the cyclopentadienyl (or substituted cyclopentadienyl, such as indenyl or substituted indenyl) rings, when bridged to each other, will be lower alkyl-substituted ($C_1$–$C_6$) in the 2 position and will additionally comprise alkyl, cycloalkyl, aryl, alkylaryl and or arylalkyl subtituents, the latter as either of fused or pendant ring structures including multi-ring structures, for example, those of U.S. Pat. Nos. 5,278,264 and 5,304,614 (both fully incorporated herein by reference). Such substituents should each have essentially hydrocarbyl characteristics and will typically contain up to 30 carbon atoms but may be hetero-atom containing with not more than 1–3 non-hydrogen/carbon atoms, e.g., N, S, O, P, and Si.

Preferred transition metal compounds are one or more of those consistent with the formula:

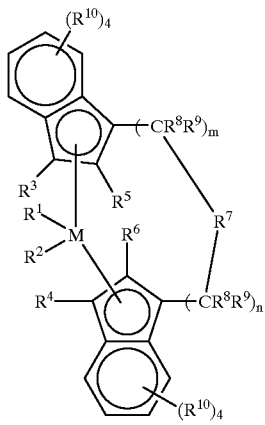

wherein M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, or a $C_8$–$C_{40}$ arylalkenyl group, preferably a $C_8$–$C_{12}$ arylalkenyl group;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

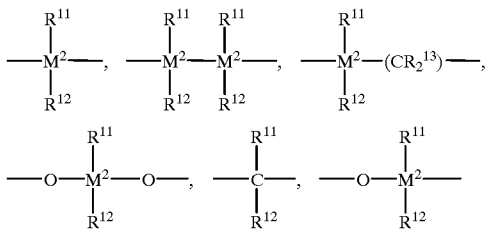

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_0$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^3$, $R^4$, and $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) refers to fluorine, chlorine, bromine or iodine atoms, preferably fluorine or chlorine.

Particularly preferred transition metal compounds are compounds of the structures (A) and (B):

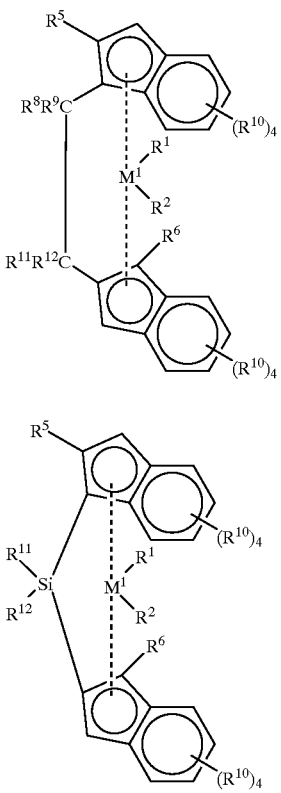

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

These chiral transition metal compounds may be used as a racemate for the preparation of highly isotactic polypropylene copolymers. It is also possible to use the pure R or S form. An optically active polymer can be prepared with these pure stereoisomeric forms. Preferably the meso form of the transition metal compound is removed to ensure the center (i.e., the metal atom) provides stereoregular polymerization. Separation of the stereoisomers can be accomplished by known literature techniques. For special products it is also possible to use rac/meso mixtures.

Illustrative but non-limiting examples of preferred transition metal compounds include: Dimethylsilandiylbis (2-methyl-4-phenyl-1-indenyl)Zr(CH$_3$)$_2$
Dimethylsilandiylbis(2-methyl-4,5-benzoindenyl) Zr(CH$_3$)$_2$;
Dimethylsilandiylbis(2-methyl-4,6-diisopropylindenyl) Zr(CH$_3$)$_2$,
Dimethylsilandiylbis(2-ethyl-4-phenyl-1-indenyl) Zr(CH$_3$)$_2$,
Dimethylsilandiylbis (2-ethyl-4-naphthyl-1-indenyl) Zr(CH$_3$)$_2$,
Phenyl(methyl)silandiylbis(2-methyl-4-phenyl-1-indenyl) Zr(CH$_3$ )$_2$,
Dimethylsilandiylbis(2-methyl-4-(1-naphthyl)-1-indenyl) Zr(CH$_3$)$_2$,
Dimethylsilandiylbis(2-methyl-4-(2-naphthyl)-1-indenyl) Zr(CH$_3$ )$_2$,
Dimethylsilandiylbis(2-methyl-indenyl) Zr(CH$_3$)$_2$,
Dimethylsilandiylbis(2-methyl-4,5-diisopropyl-1-indenyl) Zr(CH$_3$)$_2$,
Dimethylsilandiylbis(2,4,6-trimethyl-1-indenyl) Zr(CH$_3$)$_2$,
Phenyl(methyl)silandiylbis(2-methyl-4,6-diisopropyl-1-indenyl) Zr(CH$_3$)$_2$, 1,2-Ethandiylbis(2-methyl-4,6-diisopropyl-1-indenyl) Zr(CH$_3$)$_2$, 1,2-Butandiylbis(2-methyl-4,6-diisopropyl-1-indenyl) Zr(CH$_3$)$_2$,
Dimethylsilandiylbis(2-methyl-4-ethyl-1-indenyl) Zr(CH$_3$)$_2$,
Dimethylsilandiylbis(2-methyl-4-isopropyl-1-indenyl) Zr(CH$_3$)$_2$,
Dimethylsilandiylbis(2-methyl-4-t-butyl-1-indenyl) Zr(CH$_3$)$_2$,
Phenyl(methyl)silandiylbis(2-methyl-4-isopropyl-1-indenyl) Zr(CH$_3$ )$_2$,
Dimethylsilandiylbis(2-ethyl-4-methyl-1-indenyl) Zr(CH$_3$)$_2$,
Dimethylsilandiylbis(2,4-dimethyl-1-indenyl) Zr(CH$_3$)$_2$,
Dimethylsilandiylbis(2-methyl-4-ethyl-1-indenyl) Zr(CH$_3$)$_2$,
Dimethylsilandiylbis(2-methyl-α-acenaphth-1-indenyl) Zr(CH$_3$)$_2$,
Phenyl(methyl)silandiylbis(2-methyl-4,5-benzo-1-indenyl) Zr(CH$_3$)$_2$,
Phenyl(methyl)silandiylbis(2-methyl-4,5-(methylbenzo)-1-indenyl) Zr(CH$_3$)$_2$,
Phenyl(methyl)silandiylbis(2-methyl-4,5-(tetramethylbenzo)-1-indenyl) Zr(CH$_3$ )$_2$,
Phenyl(methyl)silandiylbis (2-methyl-α-acenaphth-1-indenyl) Zr(CH$_3$)$_2$, 1,2-Ethandiylbis(2-methyl-4,5-benzo-1-indenyl) Zr(CH$_3$)$_2$, 1,2-Butandiylbis(2-methyl-4,5-benzo-1-indenyl) Zr(CH$_3$)$_2$,
Dimethylsilandiylbis(2-methyl-4,5-benzo-1-indenyl) Zr(C$_3$)$_2$, 1,2-Ethandiylbis(2,4,7-trimethyl-1-indenyl) Zr(CH$_3$)$_2$,
Dimethylsilandiylbis(2-methyl-1-indenyl) Zr(CH$_3$)$_2$, 1,2-Ethandiylbis(2-methyl-1-indenyl) Zr(CH$_3$)$_2$,
Phenyl(methyl)silandiylbis(2-methyl-1-indenyl) Zr(CH$_3$)$_2$,
Diphenylsilandiylbis(2-methyl-1-indenyl) Zr(CH$_3$)$_2$, 1,2-Butandiylbis(2-methyl-1-indenyl) Zr(CH$_3$)$_2$,
Dimethylsilandiylbis(2-ethyl-1-indenyl) Zr(CH$_3$)$_2$,
Dimethylsilandiylbis(2-methyl-5-isobutyl-1-indenyl) Zr(CH$_3$)$_2$,
Phenyl(methyl)silandiylbis(2-methyl-5-isobutyl-1-indenyl) Zr(CH$_3$)$_2$,
Dimethylsilandiylbis(2-methyl-5-t-butyl-1-indenyl) Zr(CH$_3$)$_2$,
Dimethylsilandiylbis(2,5,6-triinethyl-1-indenyl) Zr(CH$_3$)$_2$, and the like.

These preferred transition metal compound components are described in detail in U.S. Pat. Nos. 5,145,819, 5,243, 001; 5,239,022; 5,329,033; 5,296,434; 5,276,208; 5,672, 668, 5,304,614 and 5,374,752; and EP 549 900 and 576 970 all of which are herein filly incorporated by reference.

Additionally, metallocenes such as those described in U.S. Pat. No. 5,510,502, U.S. Pat. No. 4,931,417, U.S. Pat. No. 5,532,396, U.S. Pat. No. 5,543,373, WO 98/014585, EP611 773 and WO 98/22486 (each fully incorporated herein by reference) are suitable for use in this invention.

The supported ionic catalyst composition of this invention can be prepared, for example, by selecting as the Lewis acid which forms the Lewis acid-base complex, one that is capable of serving as a suitable counter anion upon protonation of the transition metal compound with the proton from Lewis acid-base hydroxyl group complex. This reaction sequence can be represented by the following chemical reaction equations

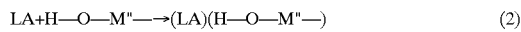

(2)

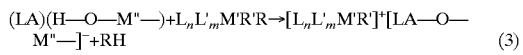

(LA)(H—O—M"—)+$L_nL'_m$M'R'R→[$L_nL'_m$M'R']⁺[LA—O—M"—]⁻+RH    (3)

where the symbols $L_n$, $L'_m$, M', R', LA, O, and M" are as defined for (1) above, H is hydrogen, and R a ligand capable of abstraction by protonation. The reaction is typically run in a hydrocarbyl solution (heptane, toluene, etc.) at ambient temperature and pressure and the supported catalyst can be separated, for example, by filtration.

A preferred embodiment of the preparation process is to add additionally a secondary proton acceptor (LB) to facilitate the reactions of Eq. (2) and (3). This reaction can be represented in the following chemical reaction equations

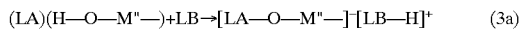

(LA)(H—O—M"—)+LB→[LA—O—M"—]⁻[LB—H]⁺    (3a)

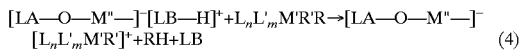

[LA—O—M"—]⁻[LB—H]⁺+$L_nL'_m$M'R'R→[LA—O—M"—]⁻[$L_nL'_m$M'R']⁺+RH+LB    (4)

where all symbols are as defined above. The reaction can be run essentially as described above. LB is a Bronsted base, such as diethylaniline which forms an ammonium salt with the supported anionic activator [LA—O—M"—]⁻, as in (3a). Other examples of LB include dimethylaniline, diphenylmethylamine, tributylamine, diphenylmethylamine, triphenylphosphine, and trimethyl phosphite.

Stereoregularity of the poly(α-olefin) may be controlled by manipulation of the activator/metallocene ratio. This ratio should be greater than 2.5. Preferably it should be greater than 7.7. Most preferably it should be greater than 16.

Part of the activator may be substituted with other anionic complexes. These complexes may be reaction products of Lewis acids, Lewis bases and the surface hydroxyls of the silica wherein the resulting anion is covalently bound to the surface and the cation is coulombically bound to the anion. The Lewis acids may be (but are not limited to) those already mentioned or their derivatives and the Lewis bases may be (but are not limited to) those already mentioned or their derivatives.

The above preparation may be performed in mineral oil commonly used for slurrying catalyst solids prior to introduction into the polymerization reactor. Thus, the silica may be slurried in the desired amount of oil. The Lewis acid and the Lewis base are added to form the activator complex. Finally, the metallocene is introduced to produce the final catalyst. No washing steps are required for this one pot preparation.

This catalyst invention is useful in coordination polymerization of unsaturated monomers conventionally known to be polymerizable under coordination polymerization conditions. Such conditions also are well known and include solution polymerization, slurry polymerization, and low pressure gas phase polymerization. The supported catalysts of the invention are thus particularly useful in the known operating modes employing fixed-bed, moving-bed, fluid-bed, or slurry processes conducted in single, series or parallel reactors.

The catalyst compositions of this invention are particularly suitable for propylene polymerizations. Any process may be used, but propylene polymerizations are most commonly conducted using a slurry processes in which the polymerization medium can be either a liquid monomer, like propylene, or a hydrocarbon solvent or diluent, advantageously aliphatic paraffin such as propane, isobutane, hexane, heptane, cyclohexane, etc. or an aromatic diluent such as toluene. The polymerization temperatures may be those considered low, e.g., less than 50° C., preferably 0° C.–30° C., or may be in a higher range, such as up to about 150° C., preferably from 50° C. up to about 80° C., or at any ranges between the end points indicated. Pressures can vary from about 100 to about 700 psia (0.76–4.8 MPa. Additional description is given in U.S. Pat. Nos. 5,274,056 and 4,182, 810 and WO 94/21962 which are each fully incorporated by reference.

Propylene homopolymers may be formed with this system using conventional batch slurry techniques. The microstructure of the homopolymer will preferably possess a meso run length as measured by 13C NMR 65% or greater relative to that produced with the unsupported metallocene catalyst. Copolymers with ethylene may be formed by introduction of ethylene to the propylene slurry or gas phase polymerization of gaseous proylene and ethylene comonomers. Copolymers with ethylene preferably contain 0 to 10 wt % comonomer. Stereoregular homopolymers and copolymers of α-olefins may be formed with this system by introduction of the appropriate monomer or monomers to a slurry or bulk propylene process.

Pre-polymerization may also be used for further control of polymer particle morphology in typical slurry or gas phase reaction processes in accordance with conventional teachings. For example such can be accomplished by pre-polymerizing a $C_2$–$C_6$ alpha-olefin for a limited time, for example, ethylene is contacted with the supported catalyst at a temperature of –15 to 30° C. and ethylene pressure of up to about 250 psig (1724 kPa) for 75 min to obtain a polymeric coating on the support of polyethylene of 30,000–150,000 molecular weight. The pre-polymerized catalyst is then available for use in the polymerization processes referred to above. In a similar manner, the activated catalyst on a support coated with a previously polymerized thermoplastic polymer can be utilized in these polymerization processes.

Additionally it is preferable to reduce or eliminate polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds of U.S. Pat. No. 5,153,157 and WO-A-91/09882 and WO-A-94/03506, noted above, and that of WO-A-93/14132.

EXAMPLES

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. In these examples certain abbreviations are used to facilitate the description. These include Me=methyl, Et=ethyl, Bu=butyl, Ph=phenyl, Cp=cyclopentadienyl, Cp*=pentamethyl cyclopentadienyl, Ind=indenyl, Ti=titanium, Hf=hafnium, Zr=zirconium, and Si=silicon. "Davison 952, calcined at 600° C." represents the commercial silica support product of Grace Davison, Inc., which has been calcined at 600° C. under a dry $N_2$ flow for 8–24 hours, so as to achieve a hydroxyl content of 0.8 to 1.2 mmol/g silica.

Example 1

Preparation of Catalyst A

In a nitrogen purged glove box, 394.32 g of Davison 952 silica was massed and placed in a 3-neck 4L reactor equipped with an overhead stirrer. 2L of dry toluene ws added and the mixture was vigorously stirred. 27.6 ml of N,N-diethyl aniline was added va syringe. 86.0g of tris (perfluorphenyl)boron was added as a solid. The mixture was stirred for I hour. 5.99 g of Dimethylsilylbis(2-methyl-4-phenyl indenyl)zirconium dimethyl was added and the mixture was stirred for 2 hours. The solvent was decanted and the solid was vacuum dried overnight. Yield. 423 g . Catalyst loading was found to be 0.02 mmol of transition metal per gram of finished catalyst.

Example 2
Preparation of Catalyst B

The procedure was the same as above except 378.1 g of silica, 26.5 ml of N,N-diethyl aniline, 82.4 g of tris (perfluorphenyl)boron, and 14.67 g of Dimethylsilylbis(2-methyl-4-phenyl indenyl)zirconium dimethyl was used. Yield: 487 g Catalyst loading was found to be 0.043 mmol of transition metal per gram of finished catalyst.

Example 3
Preparation of Catalyst C

The procedure was the same as above except 180.5 g of silica, 13.0 ml of N,N-diethyl aniline, 39.4 g of tris (perfluorphenyl)boron, and 17.5 g of Dimethylsilylbis(2-methyl-4-phenyl indenyl)zirconium dimethyl was used. Yield: 210 g Catalyst loading was found to be 0.13 mmol of transition metal per gram of finished catalyst.

Polymerization Example 1

A 2L autoclave reactor was heat dried under nitrogen flow for 45 minutes. 0.4 ml of a IM solution of triethylaluminuin solution in hexane was introduced as a scavenger. 25 mmol of $H_2$ was added followed by 1050 ml of propylene. The reactor temperature was raised to 70° C. 0.102 g of catalyst A was flushed into the reactor with 200 ml of propylene. The polymerization mixture was stirred for 1 hour at 500 rpm. The polymerization was stopped by cooling the reactor and venting the propylene. Yield: 252 g, Catalyst Efficiency: 2500 g PP/g catalyst, Melt Flow Rate: 45.4 dg/min, Tm: 155.0° C., MW 162000, MWD 3.01.

Polymerization Example 2

The reactor was prepared as in Example 1 except 0.041 g of Catalyst B was flushed into the reactor with propylene to initiate the polymerization. The polymerization mixture was stirred for 1 hour. Yield: 156 g, Catalyst Efficiency: 3800 g PP/g Catalyst, Melt Flow Rate: 317 dg/min, Tm: 152.8° C., MW 84000, MWD 2.85.

Polymerization Example 3

The reactor was prepared as in Example 1 except 0.25 ml of a 1M solution of triethylaluminum solution and 25 mmol of $H_2$ were used. 0.037 g of Catalyst C was flushed into the reactor with propylene to initiate the polymerization. The polymerization mixture was stirred for 1 hour. Yield: 265 g, Catalyst Efficiency: 7160 g PP/g Catalyst, Melt Flow Rate: 0.44 dg/min, Tm: 152.2° C., MW 461000, MWD 2.44.

Polymerization Example 4

Catalyst C was fed into the continuous pilot reactor at 70° C. with a hydrogen setpoint of 5000 mppm. Catalyst Efficiency: 8600 gPP/gcat·hr., Melt Flow Rate: 224 dg/min, Tm 152.3, MW 105000, MWD 2.70.

Polymerization Example 5

The reactor was prepared as in Example 1 except 500 ml of dry hexane was added as a solvent. 0.25 ml of a 1M solution of triethylaluminum solution, 149 mmol of $H_2$ and 500 ml of propylene were subsequently added. The reactor temperature was increased to 70° C. 0.023 g of Dimethylsilylbis(2-methyl-4-phenyl indenyl)zirconium and 0.033 g of N,N-dimethyl anilinium tetrakis(pentafluoro) borate were dissolved in 20 ml of toluene. 2 ml of this solution was flushed into the reactor with 250 ml of propylene. The polymerization mixture was stirred for 15 minutes. The reaction was stopped by cooling the reactor and venting the propylene. The hexane solvent was evaporated and the polymer was dryed. Yield: 17.0 g, Catalyst Efficiency: $4.3 \times 10^6$ g PP/mmol Zr, Tm: 155, Mw: 37000, MWD: 1.74.

TABLE 1

70° C. Propylene Polymerization Results

| Poly. No. | Support | MCN Loading (mmol/g cat.) | anion/cation ratio | Hydrogen (mmol) | Efficiency (gPP/gCat) | Tm(° C.) | Mw | MWD |
|---|---|---|---|---|---|---|---|---|
| 1 | yes | 0.02 | 17 | 25 | 2500 | 155.4 | 162 K | 3.01 |
| 2 | yes | 0.043 | 7.7 | 25 | 3800 | 152.8 | 84 K | 2.85 |
| 3 | yes | 0.13 | 2.5 | 25 | 7200 | 152.2 | 461 K | 2.44 |
| 4 | yes | 0.13 | 2.5 | 5000 mppm[1] | 8600 | 152.3 | 105 K | 2.70 |
| 5 (comp.) | no | NA | 1.0 | 149 | $4.3 \times 10^{6}$* | 155 | 37 K | 1.74 |

[1]Hydrogen set point in a continuous process.
*gPP/mmolZr

TABLE 2

Amount of Defects from $^{13}$C NMR

| Poly. No. | Stereo defects/10 K | Regio defects/10 K | Meso Run Length |
|---|---|---|---|
| 1 | 17.6 | 63.7 | 123 |
| 4 | 19.2 | 75.4 | 106 |
| 5 | 34.4 | 20.8 | 181 |

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

The following is claimed:

1. A catalyst composition comprising a metalloid or metal oxide support having covalently bound to the surface thereof directly through an oxygen atom of the metalloid or metal oxide a boron containing activator anion that is also ionically bound to a catalytically active transition metal compound, wherein the transition metal compound is present in the range of from about 0.01 to about 0.3 mmol/g catalyst, wherein the activator anion is present in the range of from about 0.01 to about 0.3 mmol/g catalyst, and wherein the transition metal compound is obtained via protonation of a compound represented by the formula:

[Structural formula showing metallocene compound with $(R^{10})_4$ groups on two indenyl rings connected by $(CR^8R^9)_m$ and $(CR^8R^9)_n$ bridges, with central metal M bonded to $R^1$, $R^2$, $R^3$, $R^4$, $R^5$, $R^6$, $R^7$]

wherein M is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

[Structural formulas showing various $R^7$ bridging groups with $M^2$, $R^{11}$, $R^{12}$, $R^{13}$, $CR_2^{13}$, and oxygen linkages]

—B($R^{11}$)—, —Al($R^{11}$)—, —Ge—, —Sn—, —O—, —S—, —SO—, —SO$_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^3$, $R^4$ and $R^{10}$ are identical or different and have the meanings stated for $R^{11}$, $R^{12}$ and $R^{13}$ and two adjacent $R^{10}$ radicals can be joined together to form a ring system.

2. The composition of claim 1 wherein said support comprises silica.

3. The composition of claim 1 wherein the activator anion is represented by the formula:

[LA—O—M″—]⁻ wherein LA is a boron containing Lewis acid capable of forming the anionic activator, O is oxygen, and M″— is the metal/metalloid of the support.

4. The composition of claim 3 wherein the support is silica.

5. The composition of claim 3 wherein LA is selected from the group consisting of: trisperfluorophenylboron, tris(3,5-di(trifluoromethyl)phenyl)boron, and tris(di-t-butylmethylsilyl)perfluorophenylboron.

6. The composition of claim 1 wherein the transition metal compound is obtained via protonation of a compound selected from the group consisting of:

Dimethylsilandiylbis (2-methyl-4-phenyl-1-indenyl)Zr (CH$_3$)$_2$

Dimethylsilandiylbis(2-methyl-4,5-benzoindenyl) Zr(CH$_3$)$_2$;

Dimethylsilandiylbis(2-methyl-4,6-diisopropylindenyl) Zr(CH$_3$)$_2$;

Dimethylsilandiylbis(2-ethyl-4-phenyl-1-indenyl) Zr(CH$_3$)$_2$;

Dimethylsilandiylbis (2-ethyl-4-naphthyl-1-indenyl) Zr(CH$_3$)$_2$,

Phenyl(methyl)silandiylbis(2-methyl-4-phenyl-1-indenyl) Zr(CH$_3$)$_2$,

Dimethylsilandiylbis(2-methyl-4-(1-naphthyl)-1-indenyl) Zr(CH$_3$)$_2$,

Dimethylsilandiylbis(2-methyl-4-(2-naphthyl)-1-indenyl) Zr(CH$_3$)$_2$,

Dimethylsilandiylbis(2-methyl-indenyl) Zr(CH$_3$)$_2$,

Dimethylsilandiylbis(2-methyl-4,5-diisopropyl-1-indenyl) Zr(CH$_3$)$_2$,

Dimethylsilandiylbis(2,4,6-trimethyl-1-indenyl) Zr(CH$_3$)$_2$,

Phenyl(methyl)silandiylbis(2-methyl-4,6-diisopropyl-1-indenyl) Zr(CH$_3$)$_2$, 1,2-Ethandiylbis(2-methyl-4,6-diisopropyl-1-indenyl) Zr(CH$_3$)$_2$, 1,2-Butandiylbis(2-methyl-4,6-diisopropyl-1-indenyl) Zr(CH$_3$)$_2$, Dimethylsilandiylbis(2-methyl-4-ethyl-1-indenyl) Zr(CH$_3$)$_2$, Dimethylsilandiylbis(2-methyl-4-isopropyl-1-indenyl) Zr(CH$_3$)$_2$, Dimethylsilandiylbis(2-methyl-4-t-butyl-1-indenyl) Zr(CH$_3$)$_2$, Phenyl(methyl)silandiylbis(2-methyl-4-isopropyl-1-indenyl) Zr(CH$_3$)$_2$, Dimethylsilandiylbis(2-ethyl-4-methyl-1-indenyl) Zr(CH$_3$)$_2$, Dimethylsilandiylbis(2,4-dimethyl-1-indenyl) Zr(CH$_3$)$_2$, Dimethylsilandiylbis(2-methyl-4-ethyl-1-indenyl) $Zr(CH_3)_2$, Dimethylsilandiylbis(2-methyl-α-acenaphthyl-1-indenyl) $Zr(CH_3)_2$, Phenyl(methyl)silandiylbis(2-methyl-4,5-benzo-1-indenyl) $Zr(CH_3)_2$, Phenyl(methyl)silandiylbis(2-methyl-4,5-(methylbenzo)-1-indenyl) $Zr(CH_3)_2$, Phenyl(methyl)silandiylbis(2-methyl-4,5-(tetramethylbenzo)-1-indenyl) $Zr(CH_3)_2$, Phenyl(methyl)silandiylbis (2-methyl-α-acenaphthyl-1-indenyl) $Zr(CH_3)_2$, 1,2-Ethandiylbis(2-methyl-4,5-benzo-1-indenyl) $Zr(CH_3)_2$, 1,2-Butandiylbis(2-methyl-4,5-benzo-1-indenyl) $Zr(CH_3)_2$, Dimethylsilandiylbis(2-methyl-4,5-benzo-1-indenyl) $Zr(CH_3)_2$, 1,2-Ethandiylbis(2,4,7-trimethyl-1-indenyl) $Zr(CH_3)_2$, Dimethylsilandiylbis(2-methyl-1-indenyl) $Zr(CH_3)_2$, 1,2-Ethandiylbis(2-methyl-1-indenyl) $Zr(CH_3)_2$, Phenyl(methyl)silandiylbis(2-methyl-1-indenyl) $Zr(CH_3)_2$, Diphenylsilandiylbis(2-methyl-1-indenyl) $Zr(CH_3)_2$, 1,2-Butandiylbis(2-methyl-1-indenyl) $Zr(CH_3)_2$, Dimethylsilandiylbis(2-ethyl-1-indenyl) $Zr(CH_3)_2$, Dimethylsilandiylbis(2-methyl-5-isobutyl-1-indenyl) $Zr(CH_3)_2$, Phenyl(methyl)silandiylbis(2-methyl-5-isobutyl-1-indenyl) $Zr(CH_3)_2$, Dimethylsilandiylbis(2-methyl-5-t-butyl-1-indenyl) $Zr(CH_3)_2$, and Dimethylsilandiylbis(2,5,6-trimethyl-1-indenyl) $Zr(CH_3)_2$.

7. The composition of claim 1 wherein the activator to transition metal compound ratio is greater than 2.5.

8. A process for polymerizing olefins comprising contacting one or more olefinic monomers under suitable polymerization condition with the catalyst composition of claim 1.

9. A process for making isotactic propylene polymers comprising contacting propylene optionally with one or more other olefinic monomers under suitable polymerization condition with the catalyst composition of claim 1.

10. A process for making isotactic propylene polymers comprising contacting propylene optionally with one or more other olefinic monomers under suitable polymerization condition with the catalyst composition of claim 6.

* * * * *